United States Patent
Kraus et al.

(10) Patent No.: US 7,014,358 B2
(45) Date of Patent: Mar. 21, 2006

(54) RADIATION THERMOMETER COMPRISING A HEATED MEASURING TIP

(75) Inventors: Bernhard Kraus, Braunfels (DE); Alexander Klös, Hofheim (DE)

(73) Assignee: Braun GmbH, Kronberg im Taunus (DE)

( * ) Notice: Subject to any disclaimer, the term of this patent is extended or adjusted under 35 U.S.C. 154(b) by 0 days.

(21) Appl. No.: 10/467,309

(22) PCT Filed: Feb. 2, 2002

(86) PCT No.: PCT/EP02/01735

§ 371 (c)(1), (2), (4) Date: Jan. 5, 2004

(87) PCT Pub. No.: WO02/066947

PCT Pub. Date: Aug. 29, 2002

(65) Prior Publication Data

US 2004/0086022 A1 May 6, 2004

(30) Foreign Application Priority Data

Feb. 19, 2001 (DE) ................. 101 08 095

(51) Int. Cl.
G01K 5/00 (2006.01)
A61B 6/00 (2006.01)

(52) U.S. Cl. .................. 374/121; 374/133; 374/164; 600/474

(58) Field of Classification Search .............. 374/121, 374/164, 131, 132, 120, 130, 133; 600/474; 702/131, 135
See application file for complete search history.

(56) References Cited

U.S. PATENT DOCUMENTS

| 3,491,596 A | | 1/1970 | Dean | |
|---|---|---|---|---|
| 4,158,965 A | * | 6/1979 | Prosky | 374/164 |
| 4,204,429 A | * | 5/1980 | Shimazaki et al. | 374/164 |
| 4,895,164 A | * | 1/1990 | Wood | 600/549 |
| 5,127,742 A | * | 7/1992 | Fraden | 374/129 |
| 5,293,877 A | * | 3/1994 | O'Hara et al. | 600/549 |
| 5,522,662 A | * | 6/1996 | Shiokawa | 374/130 |
| 5,632,555 A | * | 5/1997 | Gregory et al. | 374/102 |
| 6,109,784 A | * | 8/2000 | Weiss | 374/164 |
| 6,192,268 B1 | * | 2/2001 | Yamamoto et al. | 600/474 |
| 6,435,711 B1 | * | 8/2002 | Gerlitz | 374/130 |
| 6,522,912 B1 | * | 2/2003 | Nakatani et al. | 600/474 |
| 6,572,264 B1 | * | 6/2003 | Egawa | 374/133 |
| 6,609,824 B1 | * | 8/2003 | Sato et al. | 374/132 |
| 6,632,016 B1 | * | 10/2003 | Chen et al. | 374/164 |
| 2001/0053171 A1 | * | 12/2001 | Sato et al. | 374/121 |
| 2003/0060717 A1 | * | 3/2003 | Kraus et al. | 600/474 |
| 2003/0111605 A1 | * | 6/2003 | Sato et al. | 250/338.4 |
| 2005/0094705 A1 | * | 5/2005 | Chi | 374/129 |

FOREIGN PATENT DOCUMENTS

| EP | 1 081 475 | | 3/2001 |
|---|---|---|---|
| JP | 54025882 A | * | 2/1979 |
| JP | 63085322 A | * | 4/1988 |
| JP | 03273121 A | * | 12/1991 |
| JP | 04299225 A | * | 10/1992 |
| WO | 92 10133 | | 6/1992 |
| WO | 00 58703 | | 10/2000 |

* cited by examiner

Primary Examiner—Gail Verbitsky
Assistant Examiner—Mirellys Jagan
(74) Attorney, Agent, or Firm—Morgan, Lewis & Bockius LLP

(57) ABSTRACT

The invention relates to an infrared thermometer, especially an ear thermometer for measuring temperature, comprising an infrared sensor, a measuring tip which can be heated by a heating element, an actuating device which can be operated by a user, a control device and a display device. The invention also relates to a method for measuring temperature, especially by means of a radiation thermometer having a heatable measuring tip. Said control device switches off the heating element after the user has actuated an actuating device. After a certain amount of time, multiple temperature measurements are successively carried out, and the temperature to be displayed is determined from said measured temperatures or an error message is generated. At the latest, after a maximum measuring time has elapsed or after a maximum number of temperatures have been measured, the temperature to be displayed or an error message is displayed on the display device.

12 Claims, No Drawings

RADIATION THERMOMETER COMPRISING A HEATED MEASURING TIP

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

The invention relates to a radiation thermometer comprising a heated measuring tip, especially an infrared thermometer for measuring temperature. Such thermometers are known to contain an infrared sensor, an ambient temperature sensor and an evaluating device which determines the temperature of a measurement object from the output signals of the sensors.

An infrared ear thermometer comprising a measuring tip which can be heated by a built-in heating element is known from WO 00/58703. If a heated measuring tip is inserted in an auditory canal, almost no more heat exchange takes place between the measuring tip and the auditory canal so that the measuring tip and the auditory canal are in thermal equilibrium during the temperature measurement. In this way, measurement errors which arise as a result of cooling of the ear canal if the measuring tip inserted in the ear canal is cooler than said canal, are avoided. The ear thermometer is provided with a control device for regulating the temperature of the measuring tip which also determines whether the measuring tip is located in the auditory canal and switches the heating element on or off when the measuring tip is inserted in the auditory canal or withdrawn therefrom.

An infrared thermometer is known from EP 1081475 whose measuring tip can be heated at its anterior end by a heatable infrared sensor arranged there.

BRIEF SUMMARY OF THE INVENTION

Not Applicable.

BRIEF DESCRIPTION OF THE SEVERAL VIEWS OF THE DRAWING(S)

Not Applicable.

DETAILED DESCRIPTION OF THE INVENTION

The object of the invention is a radiation thermometer comprising a heatable measuring tip and a method of measurement for such a thermometer which allows the same simple operation as is known from thermometers without a heatable measuring tip.

A thermometer according to the invention is provided with a device for controlling the measuring sequence. In a preferred embodiment of a thermometer according to the invention the control device and the evaluating device are combined in a microcontroller or the like which also controls a display device. The measuring sequence is independent of whether the measuring tip is heated directly by a heating element or indirectly by a heatable infrared sensor.

The measuring sequence according to the invention is described in the following. The user will first turn on the thermometer. Turning on the thermometer results in the measuring tip of the thermometer being heated to a specific temperature, for example, to approximately 37° C. This temperature is achieved in a very short time, for example, a few seconds, in a thermometer having a structure known from WO 00/58703 or EP 1081475. The user can now insert the measuring tip of the thermometer into the ear and start the temperature measurement by actuating an actuating device, for example, by pressing a button.

The thermometer according to the invention may also contain a detecting device which establishes whether the measuring tip of the thermometer is inserted in the ear or not. In this case, the insertion of the measuring tip into the ear has the same result as actuation of the actuating device, i.e., after insertion the detection device will establish that the measuring tip is located in the ear and thereupon start the further measuring process without the user needing to actuate a separate actuating device.

With a battery-operated thermometer, it is especially advantageous if the thermometer automatically turns itself off, for example, after 1 minute in order to save current if the user has not yet actuated the actuating device by then.

After the user has actuated the actuating device, with an infrared thermometer according to the invention a measuring process takes place automatically in the following fashion: first, the heating of the measuring tip is discontinued. Preferably after a certain time has elapsed, for example 1 second, the temperature of the measurement object, i.e., especially the body temperature, is measured several times. This delay in the measuring sequence has the advantage that any temperature differences which may be present in the measuring tip or the infrared sensor can be equalized before the temperature measurements. The temperature of the measurement object to be displayed is then determined from the measured temperatures and, at the latest after a maximum measurement time has elapsed or after a maximum number of temperature measurements, is displayed on a display device. However, if the measured temperatures differ too much from one another or a minimum number of successively measured temperatures are not at least approximately the same or do not settle down to a specific value in the course of the measurement process or another suitable criterion for the validity of the measured temperatures is not satisfied, it is advantageous if an error message is output instead of a temperature, which recommends that the user repeats the temperature measuring process. The error message can be output after a minimum measuring time or a minimum number of temperature measurements if a valid temperature value can no longer be expected within the maximum measuring time or after the maximum number of temperature measurements. However, if the measured temperatures do not differ too much from one another or a minimum number of successively measured temperatures are at least approximately the same or settle down to a specific value in the course of the measurement process or another suitable criterion for the validity of the measured temperatures is satisfied, the temperature to be displayed is preferably displayed immediately, i.e. before the maximum measuring time has elapsed or before the maximum number of temperature measurements.

In a preferred embodiment of the thermometer according to the invention, during the current temperature measurements a signalling device is activated by the control device, for example, in the form of a flashing light-emitting diode and/or a series of beeps which indicates to the user that the measuring process is completed, for example, by the light-emitting diode being lit continuously and/or a long-drawn-out beep. In this way the user knows that the measuring process is not complete and he should not withdraw the thermometer from the ear.

An advantageous embodiment of the thermometer according to the invention also has a data storage device and the above-mentioned signalling device by which means the data stored in the data storage device can be output, for example, the measured temperatures, the displayed temperatures, the total number of measuring sequences carried out or the like. For this purpose the flashing of the light-emitting diode or the beeping is coded in a specific fashion so that this data can be recorded by an external reader, decoded, further processed and/or displayed.

The invention claimed is:

1. An infrared thermometer comprising an infrared sensor contained within a measuring tip, an evaluating device for processing signals from the infrared sensor to determine a measured temperature, a heating element for preheating the measuring tip, a display device for displaying a temperature or an error message, and a control device controlling the performance of the following functions:
   turning on the heating element after operation of the thermometer has been initiated,
   turning off the heating element after the measuring tip has reached a specific temperature,
   causing the infrared sensor to carry out a plurality of sequential temperature measurements after an actuating device has been actuated by a user, and
   after a maximum measurement time has elapsed or after a maximum number of temperature measurements, sending a signal containing the measured temperature or an error message to the display device.

2. The thermometer according to claim 1, further comprising
   a signaling device which can be controlled by the control device which signals that the thermometer is in operation and the end of the temperature measurements.

3. The thermometer according to claim 1, further comprising
   a data storage device and a signalling device, the data stored in the data storage device being output by means of the signaling device, and the control device controlling the signals output by the signalling device.

4. The thermometer according to claim 1, wherein the actuating device is a button, which is actuated by pressing.

5. The thermometer according to claim 1,
   the control device further carrying out the function of determining a criterion for the validity of the measured temperatures and sending a signal to the display device containing the measured temperature if the criterion is satisfied, or after a minimum measurement time or after a minimum number of temperature measurements, sending a signal to the display device containing the error message if the criterion cannot be expected to be satisfied within the maximum measurement duration or after a maximum number of temperature measurements.

6. The thermometer according to claim 5, further comprising a data storage device and a signalling device, with the data stored in the data storage device being output by means of the signaling device, and the control device controlling the signals output by the signaling device.

7. A method for measuring temperature by means of a radiation thermometer comprising a heatable measuring tip, an infrared sensor which provides temperature dependent output signals, and an evaluating device
   characterized in that after switching on the thermometer, a heating element is switched on which heats the measuring tip, the heating element being switched off either in response to the measuring tip reaching a specific temperature or in response to an actuating device being actuated by a user,
   after the actuating device has been actuated by a user, a plurality of sequential temperature measurements are carried out by means of the infrared sensor,
   the evaluating device processes the output signals from the infrared sensor to determine measured temperature values, and
   a temperature to be displayed is determined from the measured temperature values or an error message is generated, and at the latest after a maximum measurement time has elapsed or after a maximum number of temperature measurements, the temperature to be displayed or the error message is displayed on a display device.

8. The method according to claim 7, characterized in that a criterion for the validity of the measured temperatures is determined and the temperature to be displayed is then displayed if the criterion is satisfied or, after a minimum measuring time or after a minimum number of temperature measurements the error message is displayed if the criterion cannot be expected to be satisfied within the maximum measurement time or after a maximum number of temperature measurements.

9. The method according to claim 7, characterized in that the sequence and the end of the temperature measurements is signaled to the user.

10. The method according to claim 7, wherein the actuating device is a button, which is actuated by pressing.

11. A method for measuring temperature using a radiation thermometer comprising a heatable measuring tip, an infrared sensor which provides temperature dependent output signals, and an evaluating device,
    characterized in that after turning on the thermometer, a heating element is turned on which heats the measuring tip,
    after actuating an actuating device, the heating element is turned off,
    after a certain time has elapsed a plurality of temperature measurements are carried out by means of the infrared sensor,
    the evaluating device processes the output signals from the infrared sensor to determine measured temperature values,
    a temperature to be displayed is determined from the measured temperature values,
    a criterion for validity of the measured temperature values is determined and, after a minimum measuring time or after a minimum number of temperature measurements an error message is displayed if the criterion cannot be expected to be satisfied within a maximum measurement time or after a maximum number of temperature measurements, and
    if the criterion for validity is satisfied, at the latest after the maximum measurement time has elapsed or after the maximum number of temperature measurements, the temperature to be displayed is shown on a display device.

12. The method according to claim 11, wherein the actuating device is a button, which is actuated by pressing.

* * * * *